(12) United States Patent
Lu et al.

(10) Patent No.: US 6,881,503 B2
(45) Date of Patent: Apr. 19, 2005

(54) PERPENDICULAR MAGNETIC RECORDING MEDIA WITH LAMINATED MAGNETIC LAYER STRUCTURE

(75) Inventors: Bin Lu, Pittsburgh, PA (US); Dieter K. Weller, Gibsonia, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 12 days.

(21) Appl. No.: 10/606,546

(22) Filed: Jun. 26, 2003

(65) Prior Publication Data

US 2004/0053073 A1 Mar. 18, 2004

Related U.S. Application Data

(60) Provisional application No. 60/392,190, filed on Jun. 28, 2002.

(51) Int. Cl.$^7$ .............................. G11B 5/66; G11B 5/70
(52) U.S. Cl. ........................ 428/694 TS; 428/694 TM; 428/611; 428/668; 428/900
(58) Field of Search .................... 428/694 TS, 694 TM, 428/611, 668, 900

(56) References Cited

U.S. PATENT DOCUMENTS

| | | | |
|---|---|---|---|
| 4,568,599 A | | 2/1986 | Ono et al. |
| 4,749,628 A | | 6/1988 | Ahlert et al. |
| 4,792,486 A | | 12/1988 | Ishizaka et al. |
| 4,966,821 A | | 10/1990 | Kawashima et al. |
| 5,429,855 A | | 7/1995 | Kotani et al. |
| 5,840,394 A | * | 11/1998 | Ranjan et al. .............. 428/65.3 |
| 5,942,342 A | | 8/1999 | Hikosaka et al. |
| 6,083,599 A | | 7/2000 | Hirayama et al. |
| 6,183,893 B1 | | 2/2001 | Futamoto et al. |
| 6,372,330 B1 | | 4/2002 | Do et al. |
| 6,395,413 B1 | | 5/2002 | Ando |
| 6,468,670 B1 | * | 10/2002 | Ikeda et al. ................. 428/611 |
| 6,506,508 B1 | | 1/2003 | Yoshida et al. |
| 6,511,761 B1 | * | 1/2003 | Tanahashi et al. ..... 428/694 TS |
| 2001/0008716 A1 | | 7/2001 | Matsuda et al. |
| 2001/0033949 A1 | | 10/2001 | Abarra et al. |

(Continued)

OTHER PUBLICATIONS

Yamada et al., "The origin of the large perpendicular magnetic anisotropy in Co3Pt alloy thin films", Apr. 15, 1999, J. Appl. Phys., vol. 85, No. 8, pp. 5094–5096.*

Y. Yamada et al., "Large Magnetic Anisotropy in Co$_3$Pt Ordered Phase Thin Films," *Mat. Res. Soc. Symp. Proc.*, vol. 517, 1998, pp. 299–310.

Y. Kubota et al., "Intergrain Magnetic Coupling and Microstructure in CoPtCr, CoPtCrTa, and CoPtCrB Alloys," *Journal of Applied Physics*, vol. 84, No. 11, Dec. 1, 1998, pp. 6202–6207.

D. Weller et al., "High K. Materials Approach to 100 Gbits/in$^2$," *IEEE Transactions on Magnetics*, vol. 36, No. 1, Jan. 2000, pp. 10–15.

B. Lu et al., "Study of Stacking Faults in Co–Alloy Perpendicular Media," *Journal of Applied Physics*, vol. 91, No. 10, May 15, 2002, pp. 8025–8027.

U.S. Appl. No. 10/447,642, Lu et al., filed May 29, 2003.

Primary Examiner—Holly Rickman
(74) Attorney, Agent, or Firm—Robert P. Lenart, Esq.; Pietragello, Bosick & Gordon

(57) ABSTRACT

A perpendicular magnetic recording medium comprises a hard magnetic recording layer, a soft magnetic layer, and a non-magnetic intermediate layer between the hard magnetic recording-layer and the soft magnetic layer, wherein the hard magnetic recording layer includes an hcp-structured layer and a Co-alloy layer which may be either a Co$_3$Pt-alloy layer or an hcp CoPt-based alloy layer positioned adjacent to the hcp-structured layer. A magnetic disc drive storage system that includes the perpendicular magnetic recording medium is also included.

16 Claims, 11 Drawing Sheets

$(CoCr)_{75}Pt_{25}$
ORDERED STRUCTURE

○ Pt
● Co, Cr

U.S. PATENT DOCUMENTS

| | | |
|---|---|---|
| 2002/0009620 A1 | 1/2002 | Hanawa et al. |
| 2002/0064691 A1 | 5/2002 | Kanbe et al. |
| 2002/0068199 A1 | 6/2002 | Futamoto et al. |
| 2002/0132139 A1 | 9/2002 | Chang et al. |
| 2002/0136929 A1 | 9/2002 | Oikawa et al. |
| 2003/0017370 A1 | 1/2003 | Shimizu et al. |
| 2003/0039071 A1 | 2/2003 | Okuyama et al. |
| 2003/0039863 A1 | 2/2003 | Chen et al. |
| 2003/0059650 A1 | 3/2003 | Nakagawa et al. |
| 2003/0059651 A1 * | 3/2003 | Shimizu et al. ...... 428/694 TM |
| 2003/0064249 A1 | 4/2003 | Uwazumi et al. |
| 2003/0082407 A1 | 5/2003 | Sakawaki et al. |
| 2003/0091798 A1 | 5/2003 | Zheng et al. |
| 2003/0096140 A1 | 5/2003 | Tomiyasu et al. |
| 2003/0099866 A1 | 5/2003 | Takahashi et al. |
| 2003/0104250 A1 | 6/2003 | Shimizu et al. |

* cited by examiner

HPC CoCrPt ALLOY

● Co, Cr, or Pt $(CoCr)_{75}Pt_{25}$ ORDERED STRUCTURE

○ Pt
● Co, Cr

PERPENDICULAR MAGNETIC RECORDING MEDIA WITH LAMINATED MAGNETIC LAYER STRUCTURE

CROSS REFERENCE TO RELATED APPLICATION

This application claims the benefit of U.S. Provisional Patent Application Ser. No. 60/392,190, filed Jun. 28, 2002, the disclosure of which is hereby incorporated by reference.

FIELD OF THE INVENTION

The present invention relates to magnetic recording media, and more particularly to perpendicular magnetic recording media including a cobalt alloy based magnetic layer.

BACKGROUND OF THE INVENTION

The recording density of hard disc drives has increased for almost three decades. Since longitudinal magnetic recording media is constrained by the thermal stability limit, perpendicular media is the most prominent candidate for the next generation media. A typical perpendicular media comprises of a multilayer structure including a substrate covered by a soft magnetic underlayer, an interlayer, and a hard magnetic layer covered by an overcoat and an organic lubricant. The hard magnetic layer is the layer on which the information is stored. The magnetic layer can be comprised of a hexagonal close packed structured (hcp-structured) Co-alloy or a magnetic multilayer, such as Co/Pt, Co/Pd, etc.

Magnetic properties of the storage layer such as coercivity ($H_c$), remanent magnetization ($M_r$), remanence squareness of the hysteresis loop, slope of hysteresis at the coercive point ($\alpha=4\pi dM/dH|_{H=Hc}$), and magnetic cluster size ($d^*$), are crucial to the recording performance of the Co-alloy media. An objective in developing a perpendicular magnetic recording medium is to achieve a thermally stable medium with enhanced signal-to-noise ratio (SNR). The requirements for achieving this objective include, for example, suitable microstructure such as a well defined (00.2) orientation, small grain size, narrow grain size distribution, low amount of fcc phase, and low stacking fault density. Additional requirements include magnetic properties, such as, sufficient magnetic anisotropy ($K_u$), an anisotropy field ($H_k$) compatible with write fields, high negative nucleation field ($H_n$), full remanence squareness, and optimized intergranular exchange interaction. Although these requirements are similar to the requirements for other types of media, such as longitudinal media, the implementations are different due to differences in crystallographic orientation and layer construction. In a perpendicular magnetic recording medium of Co alloy material, crystalline grains are oriented with the c-axes (i.e., the magnetic easy axis) in a direction normal to the film planes. The intrinsic perpendicular anisotropy energy needs to be larger than the demagnetization energy, which typically requires a low stacking fault density.

To achieve high magnetic remanence, the orientation dispersion around the film normal should be as small as possible. To achieve a low noise medium, the average Co-alloy grains should be as small as possible but within the thermal stability limit. The grain size distribution should be as narrow as possible. Moreover, the grain boundaries should be able to magnetically isolate the neighboring grains. An interlayer which consists of the layers between the magnetic storage layer and the magnetic soft underlayer is very crucial to the microstructure of the magnetic layer.

Interlayers can effectively improve the orientation distribution, as well as enhance the epitaxial growth of the Co alloy grains. Interlayer materials which have been reported in the literature include Pt, Ge, Si, CoCr, $SiO_2$, Au, Al, CoZr, Ta, Ti, TiCr, Ru, RuCrCo, TiZr, etc. Only a few of them work well enough to meet the demands of the industry. Of all the interlayers, RuCoCr has the best structural match and lattice match. Epitaxial growth of Co-alloy grains on top of RuCoCr has been confirmed by high-resolution electron microscopy. However, little has been done so far as to reduce the grain size of the interlayer, so as to decrease the grain size of the magnetic layer. On the other hand, it is probably impossible to obtain one single interlayer fulfilling all the aforementioned criteria to achieve the desirable microstructure, magnetic properties and recording performance.

The CoCrPtB alloy is well-known for its small grain size, narrower grain size distribution, and proper chemical segregation at the grain boundaries. Its performance for longitudinal media is superior to other alloys. However, when CoCrPtB is used for perpendicular media, it is found to have high stacking fault density, which results in poor magnetic properties. On the other hand, perpendicular media made of CoCrPt have much fewer stacking faults. Therefore CoCrPt media have full squareness, larger $H_k$ and higher $K_u$. However, the magnetic grains of CoCrPt are more likely to be coupled than grains of CoCrPtB. Moreover, chemical-ordered hexagonal phase $Co_3Pt$ is found to have hard magnetic properties superior to hcp Co-alloys.

This invention provides a design that best utilizes the advantages of CoCrPtB, CoCrPt and $Co_3Pt$ media while maintaining the excellent perpendicular orientation of the magnetic layer.

SUMMARY OF THE INVENTION

This invention provides a perpendicular magnetic recording medium comprising a hard magnetic recording layer, a soft magnetic layer, and a non-magnetic intermediate layer between the hard magnetic recording layer and the soft magnetic layer, wherein the hard magnetic recording layer includes an hcp-structured layer and a Co-alloy layer which may be either a $Co_3Pt$-alloy layer or an hcp CoPt-based alloy layer positioned adjacent to the hop-structured layer.

The hcp-structured layer can comprise CoPtXY alloy, where X is a grain-refining material and Y is another element added for either adjusting the $M_s$ value, or for enhancing the magnetic grain separation. The grain-refining material can comprise a material selected from the group of: B, C, Zr, and Hf. Alternatively, the grain-refining material can comprise an oxide, such as a material selected from the group of: $SiO_2$, $Al_2O_3$, CoO, $CrO_2$, and $NiO_2$. The Y element can comprise a material selected from the group of Ta, Cr, Nb, Mo, Si, and Ge. The Co-alloy layer can comprise a hcp CoPt-based alloy or a chemical-ordered $CO_3Pt$ alloy. Additional elements may be added to the hcp CoPt-based alloy or chemical-ordered $Co_3Pt$ alloy for either adjusting the $M_s$ value, or for enhancing the magnetic grain separation.

In another aspect, the invention encompasses a magnetic disc drive storage system, comprising a magnetic recording head having an air bearing surface, and a perpendicular magnetic recording medium positioned adjacent the air bearing surface of the magnetic recording head, wherein the perpendicular magnetic recording medium comprises a hard magnetic recording layer, a soft magnetic layer, and a non-magnetic intermediate layer between the hard magnetic recording layer and the soft magnetic layer, and the hard magnetic recording layer comprising an hcp-structured layer and a Co-alloy layer which may be either a $CO_3Pt$-alloy layer or an hcp CoPt-based alloy layer positioned adjacent to the hcp-structured layer.

DETAILED DESCRIPTION OF THE INVENTION

The invention provides a thin film magnetic structure that is particularly suitable for use with a perpendicular magnetic recording medium of a magnetic disc storage system.

Figure 1:
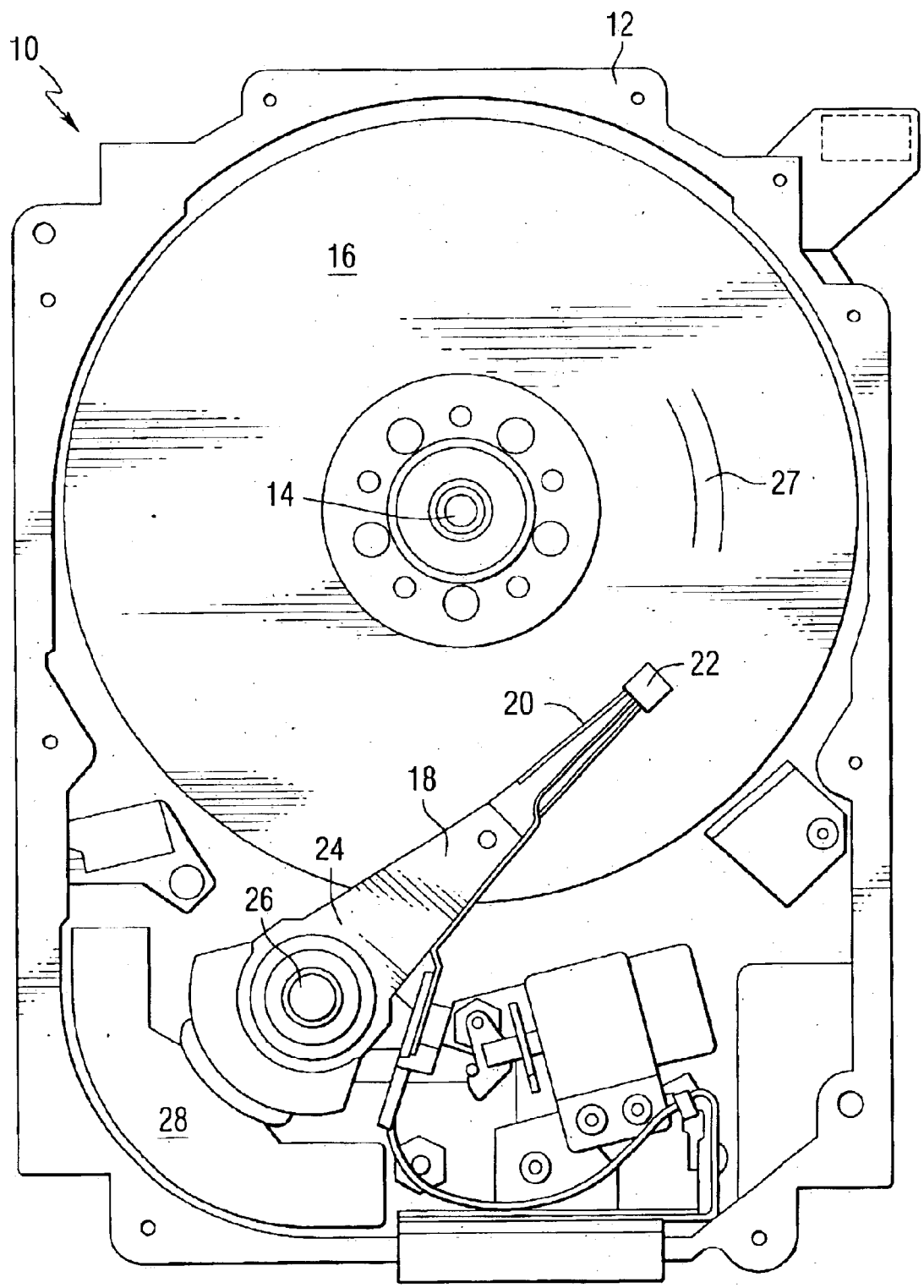
FIG. 1 is a pictorial representation of a disc drive that may utilize a perpendicular recording medium in accordance with the invention.

FIG. 1 is a pictorial representation of a disc drive 10 that can utilize a perpendicular recording medium in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing 12. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art.

Figure 2:
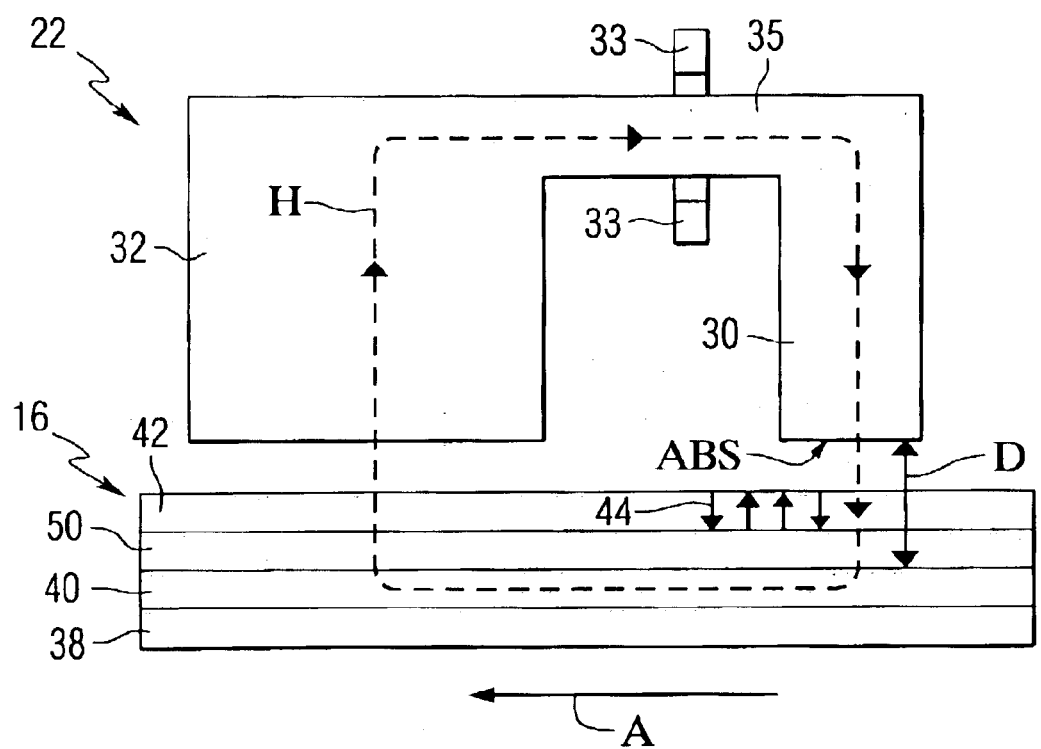
FIG. 2 is a schematic representation of a perpendicular magnetic recording head and a perpendicular recording magnetic medium in accordance with the invention.

FIG. 2 is a schematic representation of a perpendicular magnetic recording head 22 and a perpendicular recording magnetic medium 16. The recording head 22 is well-known in the art and includes a writer section comprising a trailing main pole 30 and a return or opposing pole 32. A magnetizing coil 33 surrounds a yoke 35, which connects the main pole 30 and return pole 32. The recording head 22 also may include a reader section (not shown), as is generally known in the art. The reader may include, for example, a conventional GMR reader, MR reader, inductive reader, or the like (not shown) as is also generally known in the art.

During a write operation, the perpendicular magnetic recording medium is moved past the perpendicular magnetic recording head so that the recording head follows the tracks of the recording medium, with the recording medium first passing under the opposing pole and then passing under the write pole. Current is passed through the coil to create magnetic flux within the write pole. The magnetic flux passes from the write pole tip, through the hard magnetic recording layer, into the soft magnetic layer, and across to the opposing pole. The soft magnetic layer forms inverse image charges and substantially magnifies the write field during recording.

Still referring to FIG. 2, the perpendicular magnetic recording medium 16 is positioned under the recording head 22. The recording medium 16 travels in the direction of arrow A during recording. The recording medium 16 includes a substrate 38, which may be made of any suitable material such as ceramic glass, amorphous glass, or NiP plated AlMg. A soft magnetic layer 40 is deposited on the substrate 38. The soft magnetic layer 40 may be made of any suitable material such as FeCoB, CoZrNb or NiFeNb. The soft magnetic layer 40 may have a thickness in the range of about 50 nm to about 500 nm. A hard magnetic recording layer 42, which in this embodiment is a perpendicular recording layer as illustrated by the perpendicular oriented magnetic domains 44, is deposited adjacent to or on an intermediate layer 50 that is formed adjacent to or on the soft magnetic layer 40. Suitable materials for the hard magnetic recording layer 42 may include, for example, CoCrPt, CoCrPtB, $Co_3Pt$ alloys, or Co-Pt alloys with oxides such as $Co_2O_3$, $SiO_2$, NiO, $TiO_2$, $ZrO_2$ or $SnO_2$. The hard magnetic layer 42 preferably has a hexagonally closed packed (hcp) structure or hexagonal structure and may have a thickness in the range of about 4 nm to about 20 nm. Although not shown, a protective overcoat, such as a diamond-like carbon, and/or a lubricant layer may be applied over the hard magnetic recording layer 42 as is generally known.

In order to concentrate the write flux and increase the field gradient, it is important to minimize the distance between an air-bearing surface of the recording head and the soft magnetic layer. This requires that the intermediate layer, which is between the hard magnetic recording layer and the soft magnetic layer, be as thin as possible. It also requires that the hard magnetic recording layer be as thin as possible. However, in the case of a Co alloy hard magnetic recording layer, it is very difficult to achieve a well defined (00.2) orientation of the Co alloy on top of a very thin intermediate layer due to, for example, selective grain growth at the early stage of the film growth. In addition, since stacking fault density and fcc grains tend to concentrate in the initial growth region of the Co alloy film, it is difficult to fabricate the thin and substantially defect-free hard magnetic recording-layer.

Figure 4:
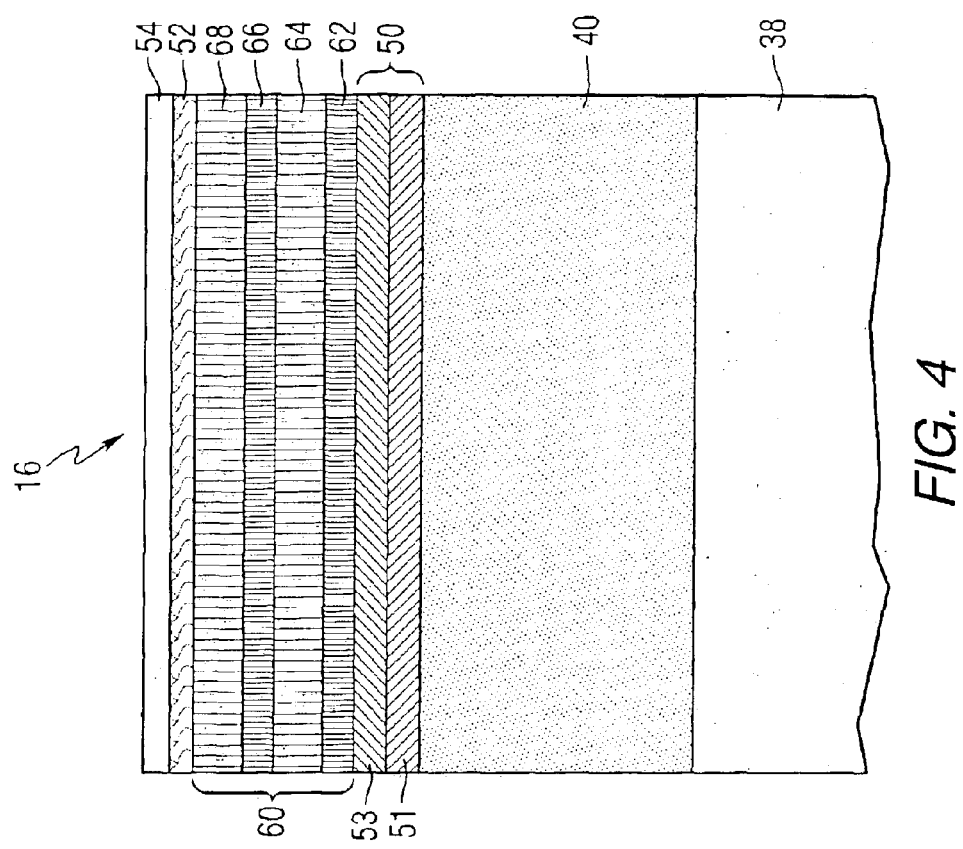
FIG. 4 is a schematic side view of a portion of another perpendicular recording magnetic medium in accordance with the invention.
Figure 3:
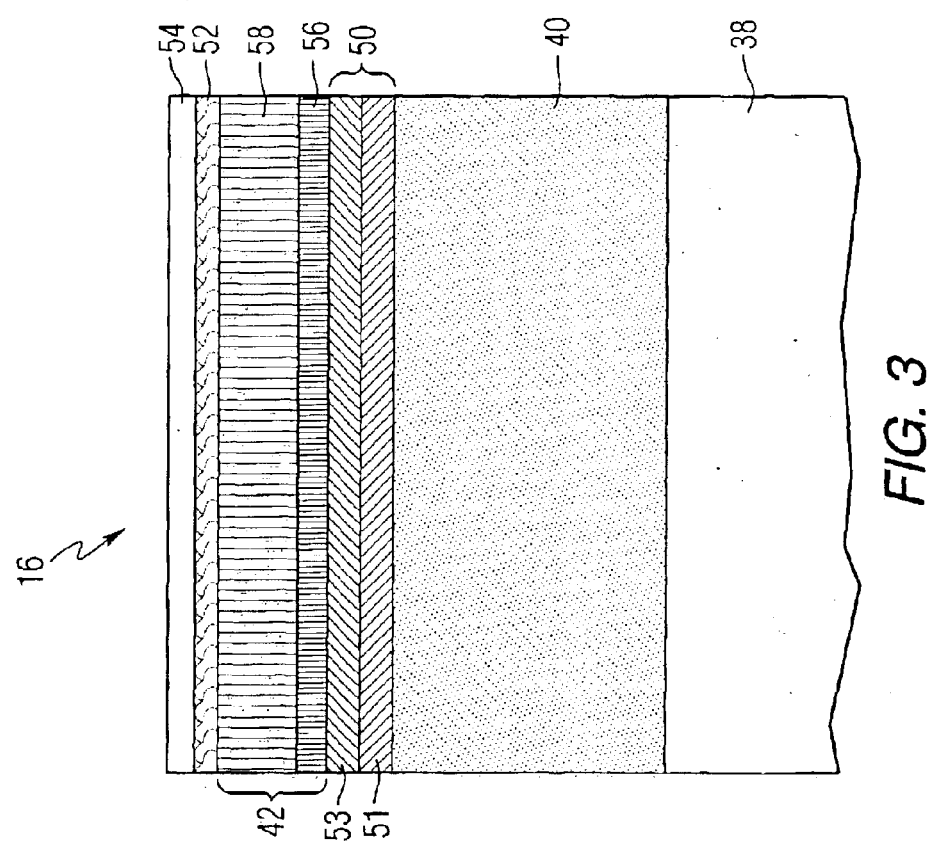
FIG. 3 is a schematic side view of a portion of a perpendicular recording magnetic medium in accordance with the invention.

FIGS. 3 and 4 are schematic illustrations of portions of multilayer structures of a thin film disc constructed in accordance with the present invention. As shown in FIG. 3, the recording medium 16 includes a substrate 38, a soft magnetic underlayer 40, an interlayer 50, a hard magnetic recording layer 42, a protective layer such as a diamond-like carbon layer 52, and a lubricant layer 54. The hard magnetic recording layer 42 includes a first layer 56 and a second layer 58.

In an alternative arrangement, shown in FIG. 4, the recording medium 16' includes a substrate 38, a soft magnetic underlayer 40, an interlayer 50, a hard magnetic recording layer 60, a protective layer 52, and a lubricant layer 54. The hard magnetic recording layer 60 includes a first layer 62; a second layer 64, a third layer 66 and a fourth layer 68.

In either case, the intermediate layer 50 can include a seedlayer 51 and an underlayer 53 between the seedlayer and the hard magnetic recording layer. The underlayer 53 may be formed of a suitable hcp material with a close lattice parameter to the Co-alloys used in magnetic layer, for example, Ru-based alloys or Re-based alloys. The underlayer may have a thickness in the range of about 1 nm to about 20 nm. The seedlayer 51 may be formed of a suitable material of hcp, fcc, bcc or even amorphous structure. It provides a smooth wetted surface for the subsequent underlayer growth. The seedlayer may have a thickness in the range of about 1 nm to 10 nm. Thus, with the seedlayer and underlayer, the intermediate layer 50 may have a total thickness in the range of about 2 nm to about 30 nm. Advantageously, the intermediate layer 50 constructed in accordance with the invention allows for the formation of the recording medium 16 and, more specifically, for the formation of the hard magnetic recording layer 42 having suitable magnetic properties for perpendicular magnetic recording.

The hard magnetic recording layer of media constructed in accordance with this invention includes at least two layers. In one example, a first layer includes a hcp CoCrPt alloy and a second layer includes hexagonal chemical-ordered $(CoCr)_3Pt$. It has been reported that a chemically ordered $Co_3Pt$ phase exhibits large perpendicular magnetic anisotropy ($K_u > 2 \times 10^7$ erg/cc), when epitaxially grown onto single crystal substrates. The intrinsic anisotropy is associated with a chemically ordered phase of $Co_3Pt$, which is not found in the equilibrium CoPt phase diagram. Nevertheless, it has been estimated that a fully ordered $Co_3Pt$ film can reach an anisotropy as high as $3.13 \times 10^7$ erg/cc. These properties, together with an intrinsic magnetization of the pure $Co_3Pt$ phase of 1100 emu/cm$^3$, could push the Co-alloys into the design regime of Tera-bit per square inch recording.

The CoCrPt alloy can include a grain-refining element such as B, C, Zr, and Hf, or a material such as $SiO_2$, $Al_2O_3$, CoO, $CrO_2$, $NiO_2$, or other oxides. For notational simplicity, the alloy can be designated as CoCrPtX, where X represents the grain-refining element or material. One such alloy is CoCrPtB. Boron is a well-known grain-refining element. CoCrPt alloy with added B usually has smaller grains. More importantly, the magnetic grains are well decoupled.

Since the atomic structure and atomic spacings of the CoCrPtB and $(CoCr)_3Pt$ alloy are close to each other in (00.2) plane, the two layers can grow epitaxially on top of each other. This invention combines the two layers to form a laminated magnetic layer. Inter-granular exchange coupling can be reduced by this design. The hard magnetic layer can include additional hcp-structured layers and Co-alloy layers positioned alternately in a laminated structure.

Figure 5:
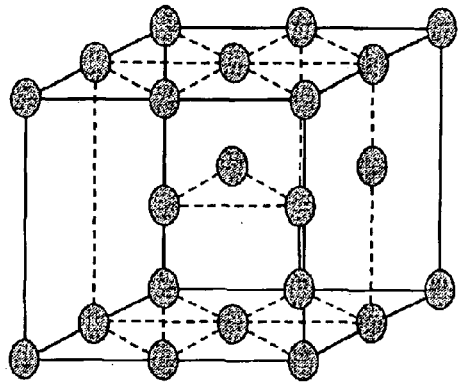
FIG. 5 is a schematic illustration of the atomic structure of a CoCrPt-hcp alloy.

FIG. 5 is a schematic illustration of the atomic structure of a CoCrPt-hcp alloy.

Figure 6:
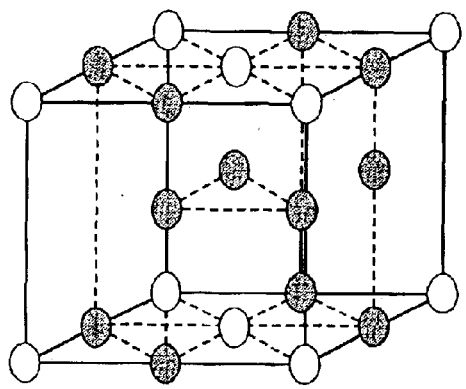
FIG. 6 is a schematic illustration of the atomic structure of $(CoCr)_3Pt$.

FIG. 6 is a schematic illustration of the atomic structure of $(CoCr)_3Pt$.

Figure 7:
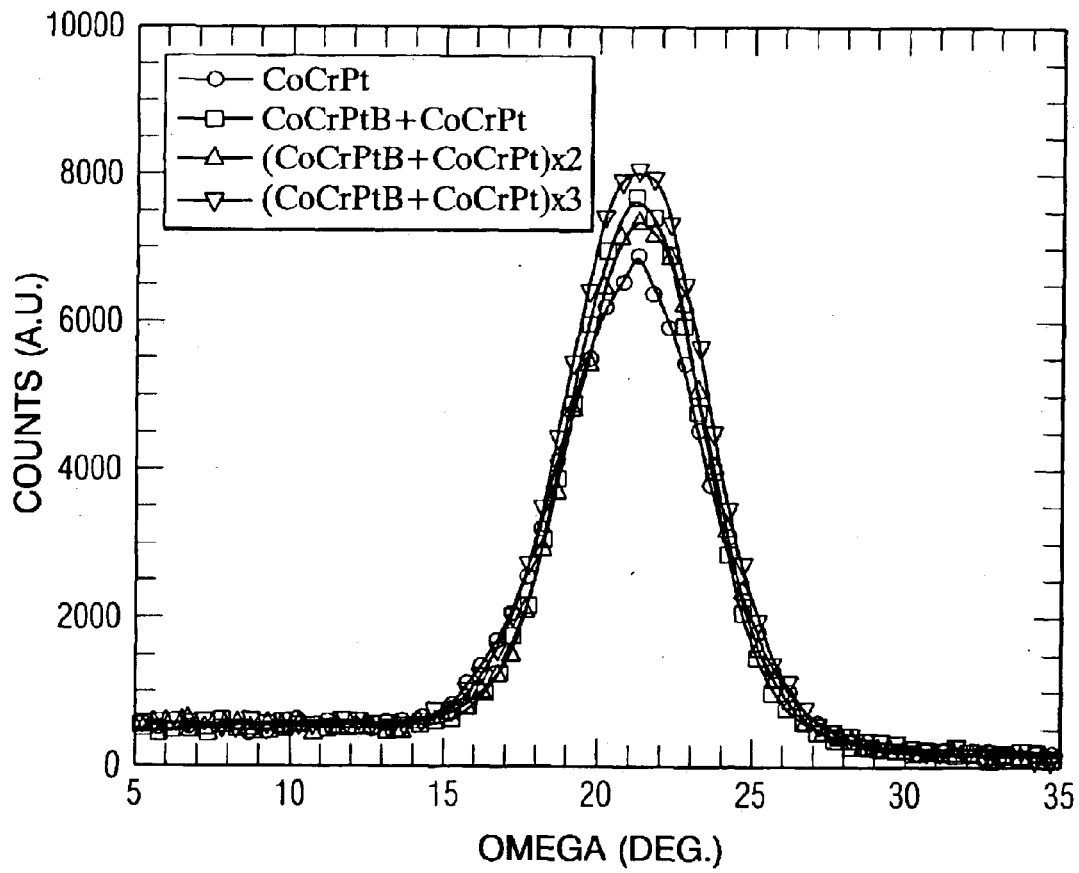
FIG. 7 shows X-ray diffraction scans of several perpendicular media structures.

FIG. 7 shows X-ray diffraction (XRD) 2-theta scans of the perpendicular media with a single $(CoCr)_3Pt$ layer, a CoCrPtB+$(CoCr)_3Pt$ dual layer, a $[(CoCrPtB+(CoCr)_3Pt) \times 2]$ layer, and a $[(CoCrPtB+(CoCr)_3Pt) \times 3]$ layer, with each layer having the same total thickness of 14 nm. The media are deposited on a glass substrate with FeCoB as the SUL, and CoCr37Ru10/Ru as the interlayer. It can be seen from the indexed peaks that the interlayer, $(CoCr)_3Pt$ layer and CoCrPtB layer are all oriented in (00.2) crystallographic texture. Moreover, their peaks are close to each other suggesting a good lattice match, especially in the laminated magnetic layers.

Figure 8:
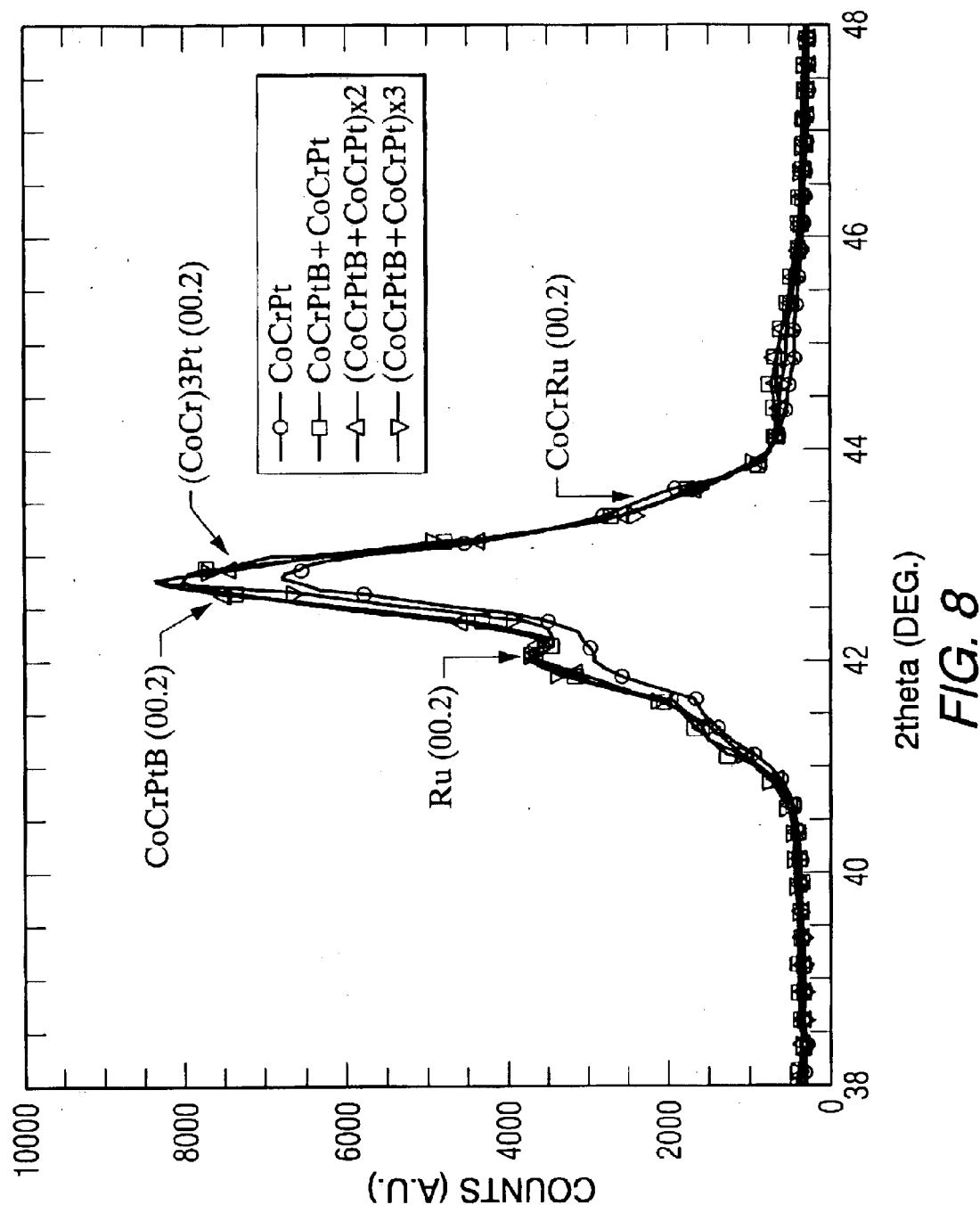
FIG. 8 shows X-ray diffraction rocking curves of the single layer and laminated layer media of FIGS. 3 and 4.

FIG. 8 shows XRD rocking curves of the single layer and laminated layer media of FIGS. 3 and 4. The full widths at half maximum (FWHM) are as narrow as 4.8°–5.6°.

Figure 9:
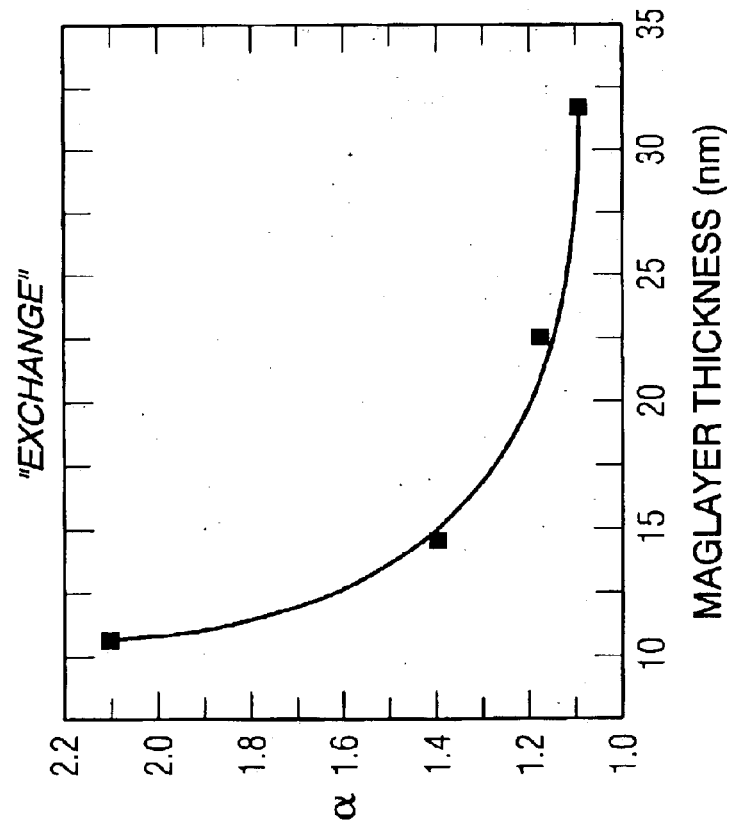
FIG. 9 is a graph showing that the hysteresis loop slope ($\alpha$) increases with the decrease of CoCrPt layer thickness and the magnetic anisotropy decreases with the thickness.

FIG. 9 shows the hysteresis loop slope ($\alpha$) increases with the decrease of CoCrPt layer thickness. The increase of the $\alpha$ value indicates that the intergranular exchange coupling becomes stronger at lower magnetic layer thickness. These results indicate a difficulty in fabricating media with thin magnetic layers.

Figure 10:
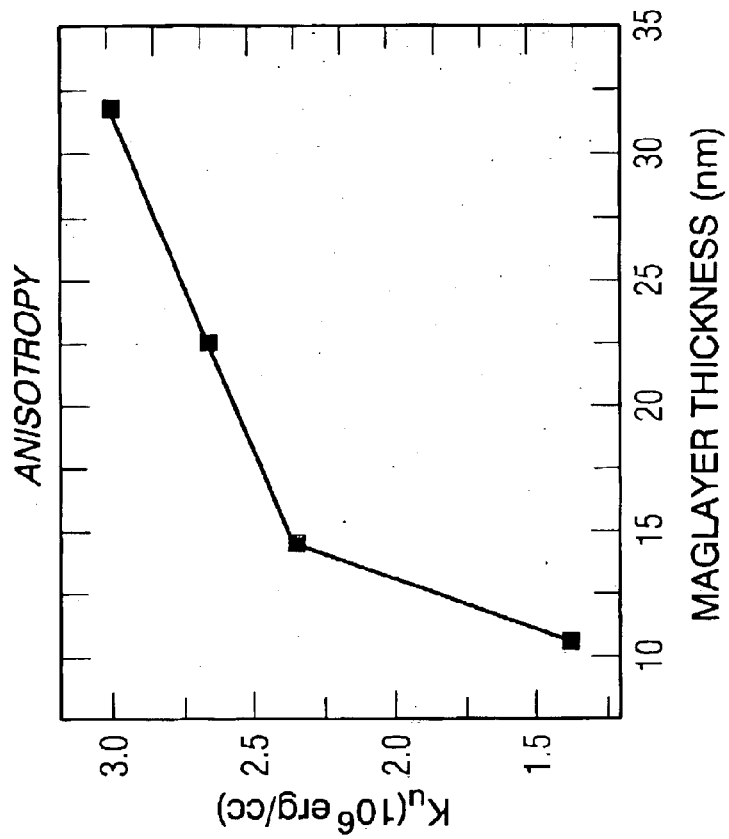
FIG. 10 is a graph showing the $H_c$ and alpha parameter dependence of the initial CoCrPtB layer thickness.

FIG. 10 shows the magnetic anisotropy decrease with the decreasing thickness. This indicates that in the thin region of the magnetic layer there more defects such as fcc phase and stacking faults. In the thicker region, there are fewer defects. Therefore, the magnetic anisotropy increases as the thickness increases. It again shows the difficulty in fabricating media with thin magnetic layers.

Figures 11, 12:
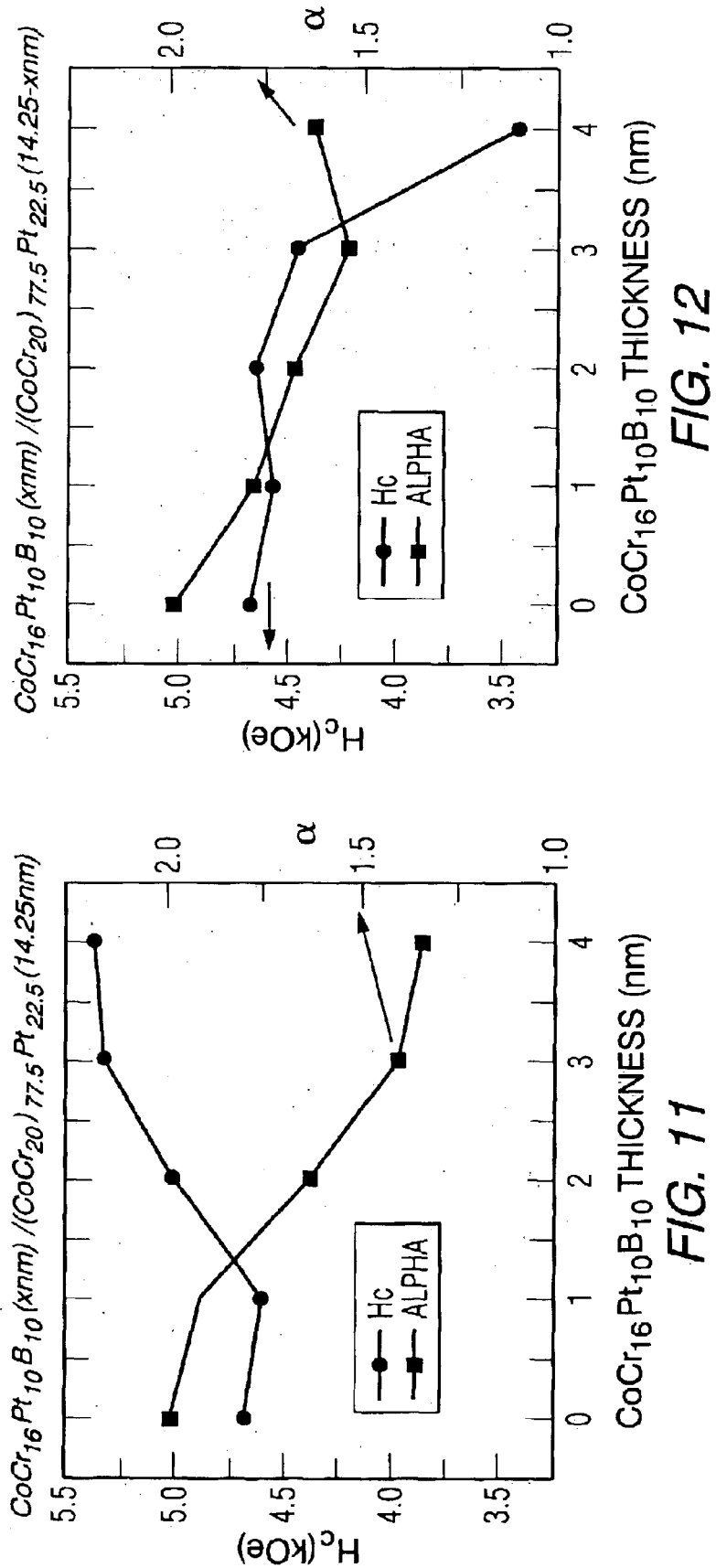
FIGS. 11 and 12 are graphs showing the dependence of $H_c$ and alpha on the CoCrPtB thickness.

FIGS. 11 and 12 show the dependence of Hc and alpha on the CoCrPtB thickness in a dual layer design (CoCrPtB/$(CoCr)_3Pt$) of the magnetic layer. In FIG. 11, the $(CoCr)_3Pt$ thickness is kept constant. It is seen that the alpha decreases with increasing thickness of the CoCrPtB layer. This indicates that the initial CoCrPtB layer can better decouple the magnetic grains. In FIG. 12, the total magnetic recording layer thickness, i.e. CoCrPtB and $(CoCr)_3Pt$ thickness is kept constant. It can be seen that alpha-parameter decreases effectively and also the H, does not decrease until the thickness of CoCrPtB is greater than 3 nm.

Figure 13:
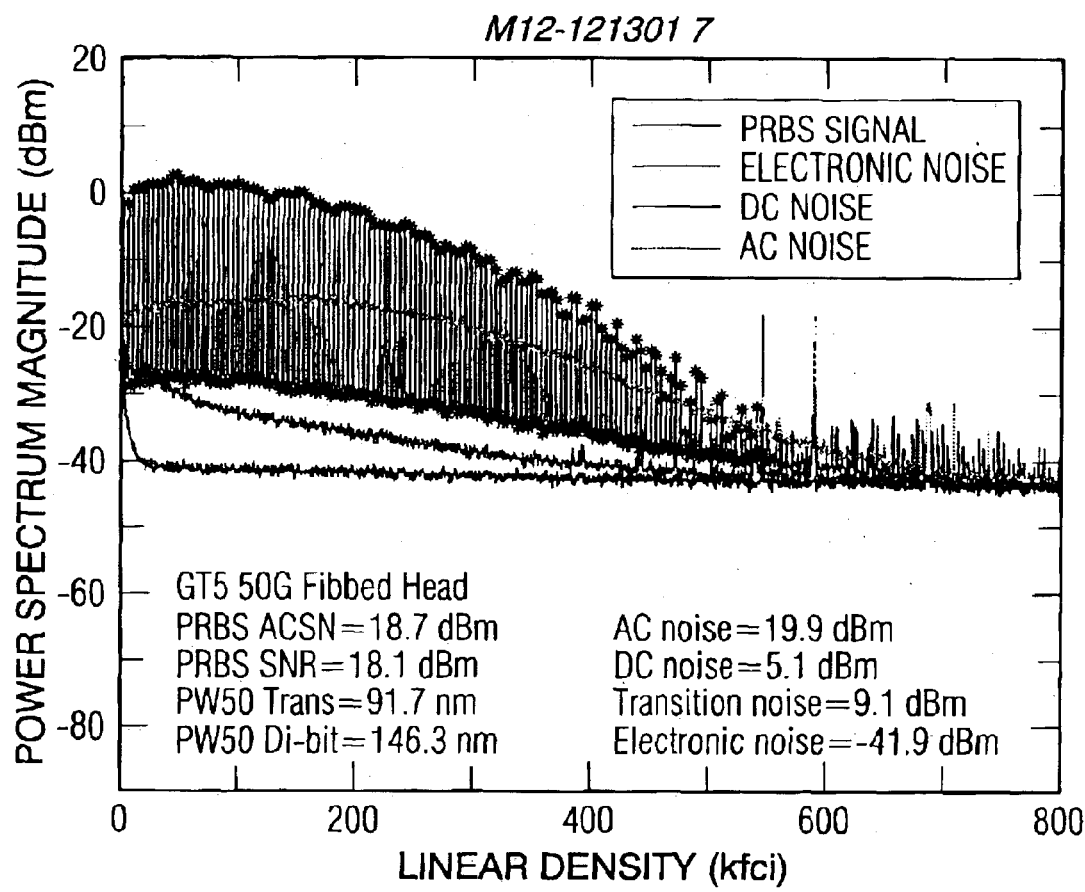
FIGS. 13, 14, 15 and 16 are graphs showing the four recording power spectra of four perpendicular media.
Figure 14:
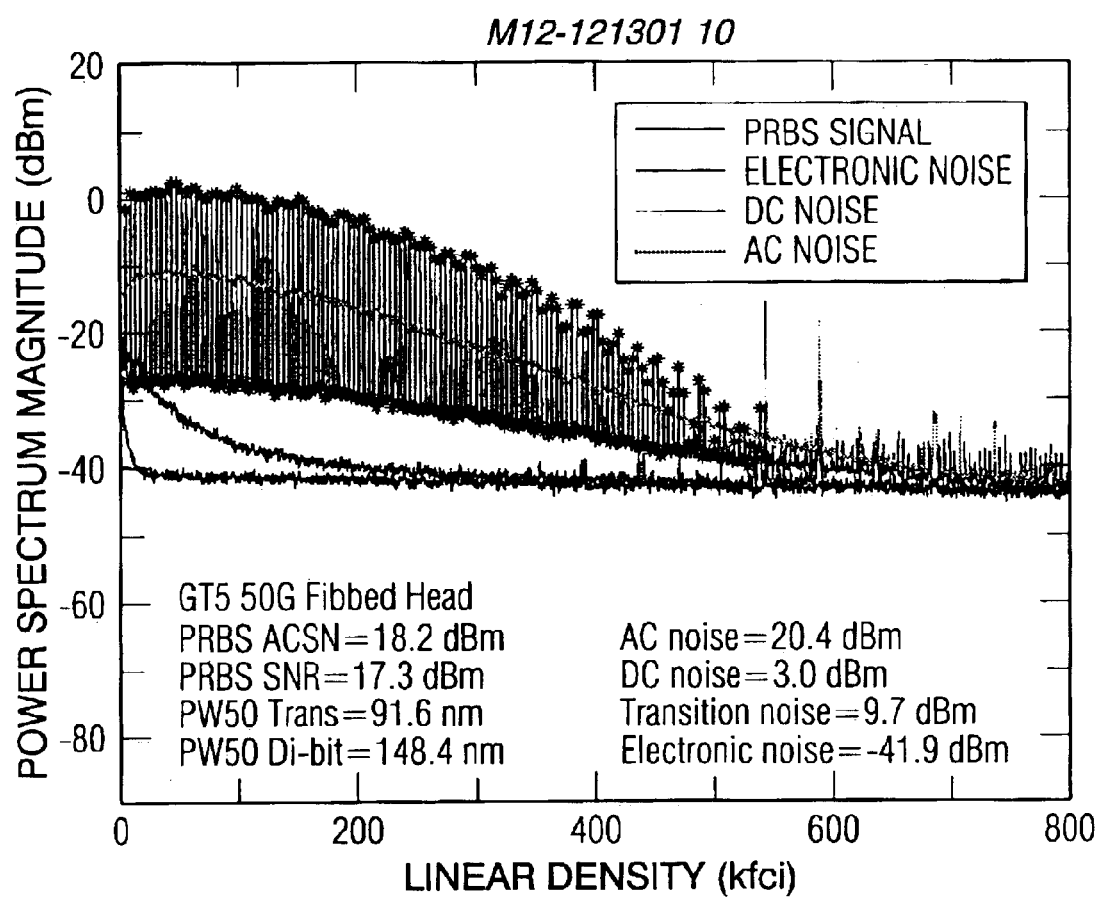
Figure 15:
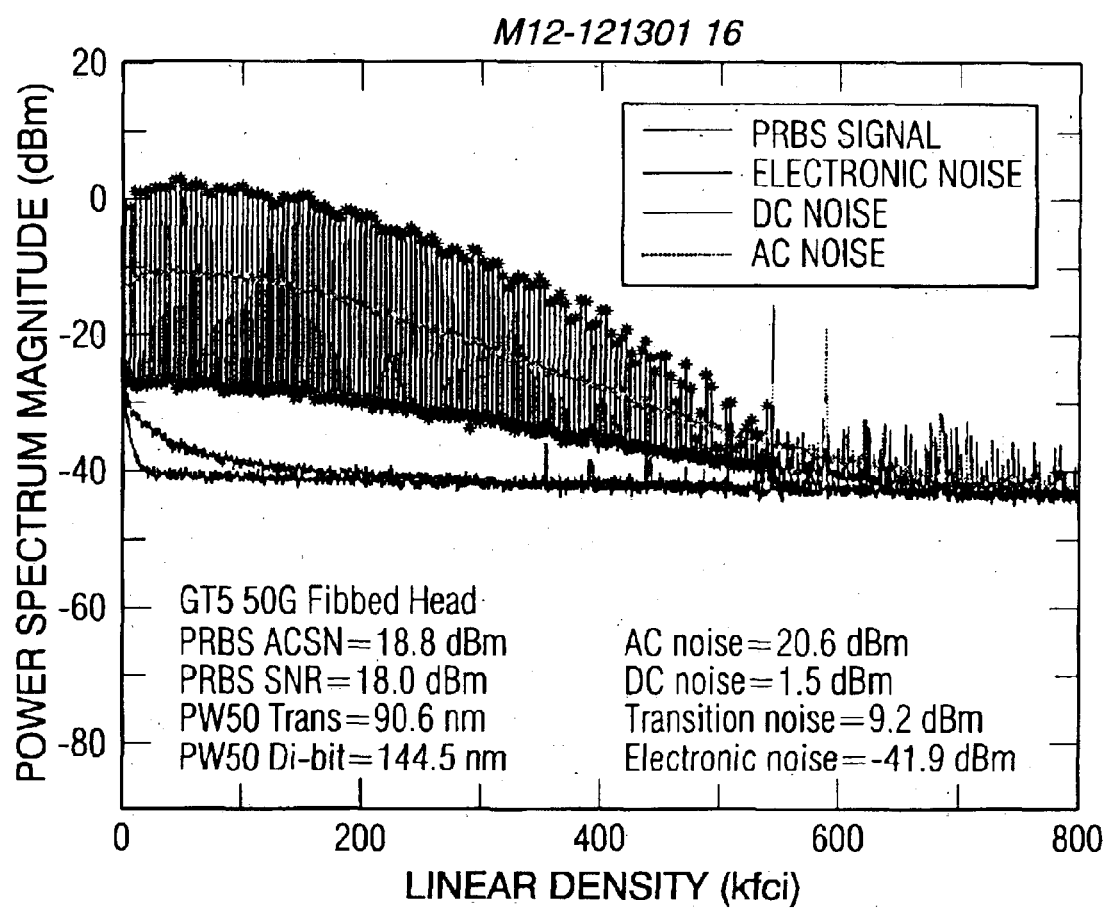
Figure 16:
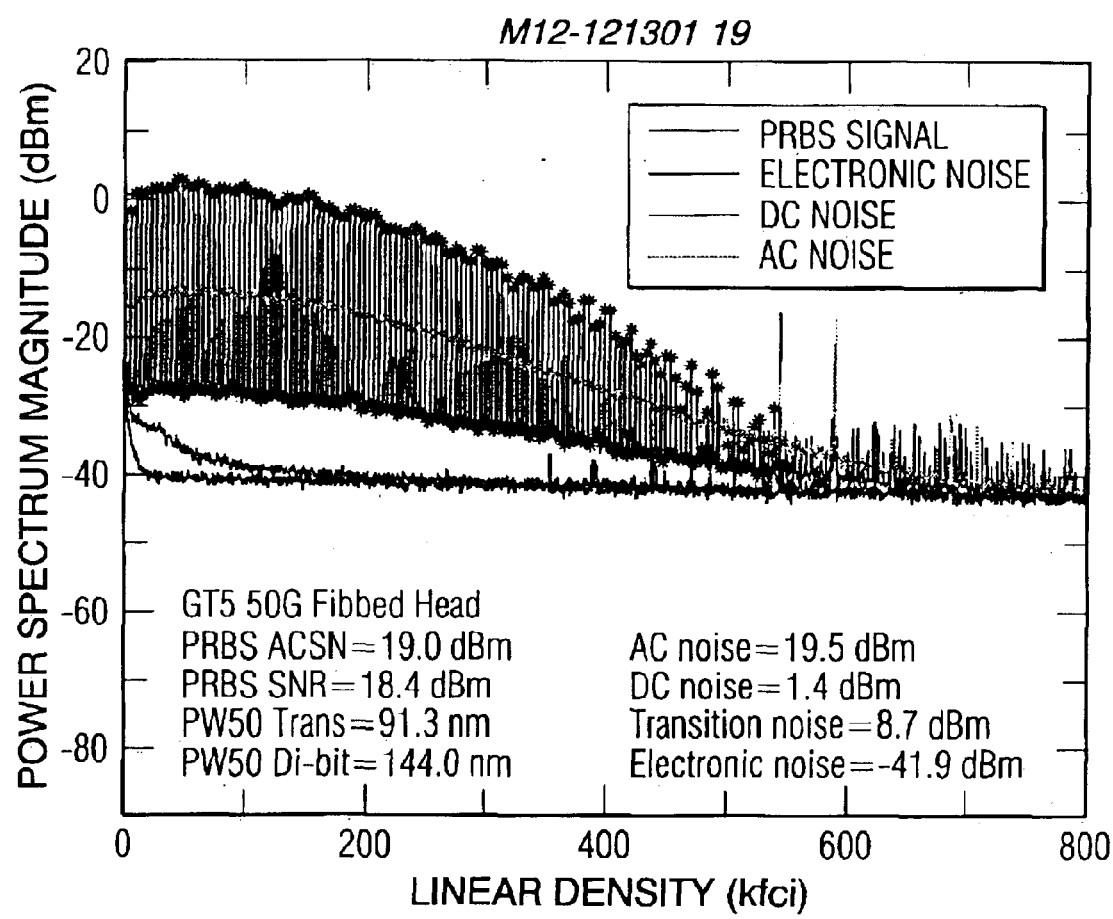

FIGS. 13, 14, 15 and 16 show PRBS power spectrum density of four recording power spectra of the four media in constructed in accordance with the invention. The data in FIG. 13 is for media having a single magnetic layer. The data in FIG. 14 is for media having 2 laminations in the recording layer. The data in FIG. 15 is for media having 4 laminations in the recording layer. The data in FIG. 16 is for media having 6 laminations in the recording layer. The total recording layer thickness in the four media are fixed at 11 nm. The DC noise is obtained by DC-erasing the media before readout. The AC noise is obtained by recording a sufficiently high frequency tone before readout (>1000 KFCI). The value of PRBS ACSN, excess AC noise and excess DC noise are listed under each spectrum. Moreover the transition width, PW50, decreases with the number of laminating layers. These results demonstrate that laminating the magnetic layer can improve the recording performance by reducing the inter-granular exchange coupling.

This invention provides a magnetic recording medium comprising a substrate, a soft magnetic underlayer, interlayer (containing an underlayer on a seedlayer), and a magnetic recording layer including an hcp-structured Co-alloy layer with grain-refining elemental additions and a chemical-ordered $Co_3Pt$-based alloy layer or hcp CoPt-based alloy layer. The grain-refining elements can be selected from a group including: B, C, Zr, and Hf, or $SiO_2$, $Al_2O_3$, CoO, $CrO_2$, $NiO_2$, and other oxides. The underlayer has a hcp structure deposited with its c-axis perpendicular to the film plane. Both the $(CoCr)_3Pt$ layer and the Co-alloy layer can be grown epitaxially on top of the interlayer. The Co-alloy layer with grain-refining elemental additions is first put down onto the underlayer. This first magnetic layer defines the grain size and grain boundaries for the whole magnetic layer. The thickness of the first Co-alloy layer can be between 0.4 nm and 5 nm. The subsequent magnetic layers are epitaxially grown on top of the first magnetic layer. The number of laminations may vary from 1 to 10. The underlayer is used to control the grain size, and the perpendicular orientation of the magnetic layer.

The magnetic layer can be covered by a carbon overcoat, which in turn is covered by an organic lubricant. Co-alloys for the lamination have an hcp structure, which is the structure of Co. Since only little grain-refining elements are added to the Co-alloy, a good lattice match with the $(CoCr)_3Pt$ magnetic layer can easily be maintained. Therefore, the two Co-alloy layers can grow epitaxially at the interface. The underlayer of the interlayer is also of an hcp structure, comprising for example, RuCoCr alloy, Ru, Re, CoCr-alloy or a combination of these materials.

The lattice match can also be achieved between the first Co-alloy layer and the underlayer. Consequently, a well-oriented magnetic layer with a magnetic easy axis (c-axis of its crystallographic structure) perpendicular to the thin film plane can be obtained. Since the first Co-alloy layer has fine grains and has well segregated grain boundaries, small grains and good grain separation in the whole magnetic layer will be realized. The grain-refining and magnetic separation can be enhanced by further laminating the magnetic layer by alternatively putting down Co-alloy layers and $(CoCr)_3Pt$ layers, which result in fine, well magnetically separated columnar magnetic grains. The thickness of the laminating Co-alloy layer in one example is about 0.5 nm to 5 nm. In addition, the Co-alloy laminating layer can be either magnetic or non-magnetic.

The present invention provides a perpendicular magnetic recording medium having a substrate; a laminated magnetic layer including a Co-alloy layer and a $(CoCr)_3Pt$ layer, both having a perpendicular magnetic orientation; and an interlayer with one or two layers of non-magnetic alloys with an hcp structure.

The hard magnetic recording layer can include at least two layers: layer "A" including CoPtXY where X comprises B, C, Zr, Hf, $SiO_2$, $Al_2O_3$, CoO, $CrO_2$, $NiO_2$, or another oxide and Y comprises, Ta, Cr, Mo, Nb, Si, Ge or another element, and layer "B", including $Co_3Pt$ phased material or hcp CoPt-based alloy. The hard magnetic recording layer can alternatively include additional A and B layers.

While the present invention has been described in terms of particular embodiments, it will be apparent to those skilled in the art that various changes can be made to the disclosed embodiments without departing from the scope of the invention as set forth in the following claims.

What is claimed is:

1. A perpendicular magnetic recording medium, comprising:
   a hard magnetic recording layer;
   a soft magnetic layer; and
   a non-magnetic intermediate layer between the hard magnetic recording layer and the soft magnetic layer, the hard magnetic recording layer comprising:
      an hcp-structured layer; and
      a Co-alloy layer comprised of a $Co_3Pt$ phased $(CoCr)_3Pt$ alloy layer positioned adjacent to the hcp-structured layer.

2. The recording medium of claim 1, wherein the hcp-structured layer comprises CoPtXY, where X is a grain-refining material, and Y is an element selected from the group consisting of: Ta, Cr, Nb, Mo, Si, and Ge.

3. The recording medium of claim 2, wherein the grain-refining material comprises a material selected from the group of: B, C, Zr, and Hf.

4. The recording medium of claim 2, wherein the grain-refining material comprises an oxide.

5. The recording medium of claim 4, wherein the grain-refining material comprises a material selected from the group of: $SiO_2$, $Al_2O_3$, CoO, $CrO_2$, and $NiO_2$.

6. The recording medium of claim 1, wherein non-magnetic intermediate layer comprises:
   a seedlayer; and
   an underlayer positioned adjacent to the seedlayer.

7. The recording medium of claim 6, wherein the underlayer comprises:
   an hcp material.

8. A perpendicular magnetic recording medium, comprising:
   a hard magnetic recording layer;
   a soft magnetic layer; and
   a non-magnetic intermediate layer between the hard magnetic recording layer and the soft magnetic layer, the hard magnetic recording layer comprising:
      an hcp-structured layer; and
      a Co-alloy layer comprised of a $Co_3Pt$ phased material layer positioned adjacent to the hcp-structured layer;
   wherein the $Co_3Pt$ phased material comprises a $Co_3Pt$-based alloy including one or more of: Ta, B, Cr, Nb, Mo, Si, and Ge.

9. A magnetic disc drive storage system, comprising:
   a magnetic recording head having an air bearing surface; and
   a perpendicular magnetic recording medium positioned adjacent the air bearing surface of the magnetic recording head;
   the perpendicular magnetic recording medium comprising a hard magnetic recording layer, a soft magnetic layer, and a non-magnetic intermediate layer between the hard magnetic recording layer and the soft magnetic layer, and the hard magnetic recording layer comprising an hcp-structured layer, and a Co-alloy layer comprised of a $Co_3Pt$ phased $(CoCr)_3Pt$ alloy layer positioned adjacent to the hcp-structured layer.

10. The system of claim 9, wherein the hcp-structured layer comprises CoPtXY, where X is a grain-refining material, and Y is an element selected from the group consisting of: Ta, Cr, Nb, Mo, Si, and Ge.

11. The system of claim 10, wherein the grain-refining material comprises a material selected from the group of: B, C, Zr, and Hf.

12. The system of claim 10, wherein the grain-refining material comprises an oxide.

13. The system of claim 12, wherein the grain-refining material comprises a material selected from the group of: $SiO_2$, $Al_2O_3$, CoO, $CrO_2$, and $NiO_2$.

14. The system of claim 9, wherein non-magnetic intermediate layer comprises:
   a seedlayer; and
   an underlayer positioned adjacent to the seedlayer.

15. The system of claim 14, wherein the underlayer comprises:
   an hcp material.

16. A magnetic disc drive storage system, comprising:
   a magnetic recording head having an air bearing surface; and a perpendicular magnetic recording medium positioned adjacent the air bearing surface of the magnetic recording head;

the perpendicular magnetic recording medium comprising a hard magnetic recording layer, a soft magnetic layer, and a non-magnetic intermediate layer between the hard magnetic recording layer and the soft magnetic layer, and the hard magnetic recording layer comprising an hcp-structured layer, and a Co-alloy layer comprised of a $Co_3Pt$ phased material layer positioned adjacent to the hcp-structured layer;

wherein the $Co_3Pt$ phased material comprises a $Co_3Pt$-based alloy including one or more of: Ta, B, Cr, Nb, Mo, Si, and Ge.

* * * * *

UNITED STATES PATENT AND TRADEMARK OFFICE
CERTIFICATE OF CORRECTION

PATENT NO. : 6,881,503 B2  
DATED : April 19, 2005  
INVENTOR(S) : Bin Lu and Dieter K. Weller It is certified that error appears in the above-identified patent and that said Letters Patent is hereby corrected as shown below:

Title page,  
Item [56], References Cited, OTHER PUBLICATIONS,  
"D. Weller" reference, after "High", "K." should read -- $K_u$ --.  
Item [74], *Attorney, Agent, or Firm,* "Pietragello," should read -- Pietragallo, --.  
Item [57], ABSTRACT,  
Line 4, "recording-layer" should read -- recording layer --.

Column 2,  
Line 44, "hop-structured" should read -- hcp-structured --.

Column 4,  
Line 58, "recording-layer" should read -- recording layer --.

Column 5,  
Line 6, "62;" should read -- 62, --.

Column 6,  
Line 36, "H," should read -- $H_c$ --.  
Line 50, "KFCI" should read -- kFCI --.

Signed and Sealed this

Eleventh Day of April, 2006

JON W. DUDAS  
*Director of the United States Patent and Trademark Office*